No. 856,532. PATENTED JUNE 11, 1907.
A. LARSEN.
COASTER BRAKE.
APPLICATION FILED JULY 10, 1906.
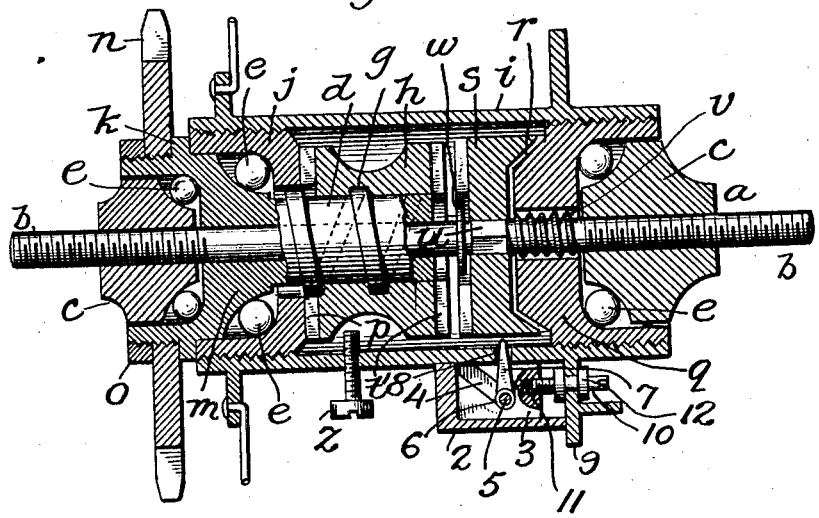
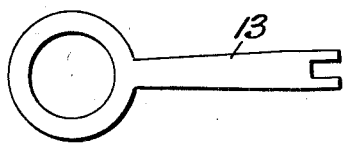
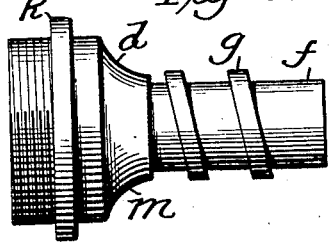
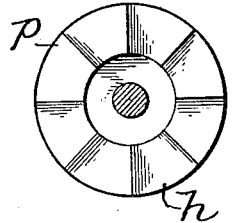
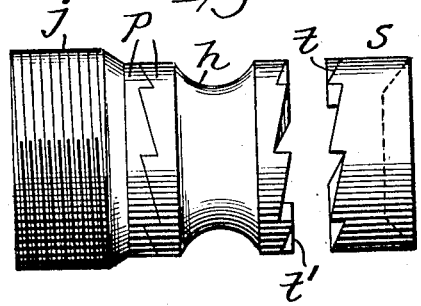
WITNESSES
James F. Duhamel
M. Hamilton
INVENTOR
Anders Larsen
BY James Hamilton
ATTORNEY

UNITED STATES PATENT OFFICE.

ANDERS LARSEN, OF ODENSE, DENMARK, ASSIGNOR TO JAMES PETER LARSON, OF BALDWIN, WISCONSIN.

COASTER-BRAKE.

No. 856,532.     Specification of Letters Patent.     Patented June 11, 1907.

Application filed July 10, 1906. Serial No. 325,432.

*To all whom it may concern:*

Be it known that I, ANDERS LARSEN, a subject of the King of Denmark, residing at Odense, in the Kingdom of Denmark, have invented certain new and useful Improvements in Coaster-Brakes, of which the following is a specification, reference being had to the accompanying drawing.

My invention relates to improvements in coaster brakes, and the object of my invention is to provide a coaster brake made up of few parts, simple in operation and comparatively cheap in manufacture.

In the drawings illustrating the principle of my invention and the best mode now known to me of applying that principle, Figure 1 is a central longitudinal sectional view of my new coaster brake; Fig. 2 is a detail showing the driving screw; Fig. 3 is a detail showing the clutch members; Fig. 4 is a detail end view of a clutch member; and Fig. 5 is a detail showing the key for the locking device.

The axle-bar $a$ supports the rear fork of the bicycle (not shown) and is formed with threaded ends $b$ upon which are screwed axle adjusting cones $c$. Mounted free to rotate upon the axle-bar is a driving screw $d$ the outer end of which is recessed and thereby adapted to receive one of the axle adjusting cones $c$ between which and the base of the driving screw are mounted balls $e$ in order to reduce the friction. The shank $f$ of the driving screw $d$ is formed on its exterior with a male thread $g$ adapted to engage a thread formed in the cylindrical wall of the central opening of the driving clutch $h$ which is thus made to travel by the rotation of the driving screw $d$ along the axle-bar $a$, or from end to end of the hub-shell $i$. Screwed into the hub-shell $i$ is the hub-carried clutch $j$ against the outer end of which the flange $k$ on the base of the driving screw $d$ rubs or takes a bearing and between which and the conical part $m$ of the base are mounted balls to form a ball bearing for the driving screw $d$. The latter is driven by the sprocket $n$ which is screwed up against the flange or shoulder $l$ and held in place by the locking nut $o$.

The axle-bar $a$ and the axle adjusting-cones $c$ remain stationary, while the driving screw $d$ is rotated by the sprocket wheel $n$; and relative rotatory motion between the driving screw $d$ and the driving clutch $h$ causes the latter to move longitudinally along the threaded portion of the driving screw $d$, as will be readily understood by all skilled in the art. Forward movement of the sprocket $n$ tends to cause the driving clutch to approach the hub-carried clutch $j$ until finally the teeth $p$ engage, when rotatory motion will be communicated to the hub-shell $i$, thereby driving the rear wheel (not shown) forward. The bicycle being thus driven forward and it being the desire of the rider to coast, he holds the sprocket $n$ stationary, thereby stopping the rotation of the driving screw $d$. The continued rotation of the hub-shell $i$ causes relative rotatory motion between the driving clutch $h$ and the driving screw $d$ with the result that the former is disengaged from the hub-carried clutch $j$ when it remains at rest upon the now motionless driving screw $d$. At the other end of the hub-shell $i$ and secured thereto is a brake-disk $q$ formed with a recess in its outer face between which and the axle adjusting-cone $c$ are mounted balls $e$ to form the customary ball bearing. The inner face of the hub-mounted brake-disk $q$ is beveled and is thereby adapted to fit into the recess $r$ formed in one of the faces of the slidable and non-rotatable brake-disk $s$ the other face of which is provided with teeth $t$ adapted to engage the teeth $t'$ formed upon the opposed face of the driving clutch $h$. The slidable non-rotary or axle brake-disk $s$ is mounted free to slide upon the squared portion $u$ of the axle-bar $a$ but is otherwise stationary since the axle-bar itself is stationary, as before explained. A coil spring $v$ tends to force the two brake-disks $q$, $s$ apart, while a stop-key $w$ limits the travel of the axle brake-disk $s$ toward the driving clutch $h$.

When it is desired to apply the brake to decrease the speed of the bicycle, the sprocket $n$ is rotated toward the rear (or counter-clockwise), thereby causing the driving clutch $h$ to approach the slidable axle brake-disk $s$ and ultimately to force the latter against the tension of the spring $v$ into frictional contact with the rotary hub-carried brake-disk $q$, the teeth $t$, $t'$ engaging with each other. The rotation of the hub-shell $i$ causes the brake-disk $q$ mounted therein to rub against the recessed face of the brake-disk $s$ which is held against it by the back-pedaling action exerted upon the sprocket $n$. Forward rotation of the sprocket $n$ withdraws the driving clutch h from engagement with the axle brake-disk s and allows the coil spring v to press the latter against the stop-key w away from and out of contact with the hub-mounted rotary brake-disk q.

In case the brake gets out of order, a set-screw z is forced against the driving clutch h after the latter has been engaged with the hub-carried clutch j, thereby holding the clutch h against axial movement. The bicycle is then operated as if equipped with the ordinary driving mechanism.

With the brake mechanism is combined a locking attachment the construction and operation of which are as follows: To the hub-shell i is secured a box 2 in which is slidably mounted a plate 3 formed with an inclined slot 4 in which engages the cross-piece 5 of a T-shaped locking pin 6 the shank 7 of which projects inwardly through the hub-shell i formed with a slot 8 for this purpose. In the rim or flange 9 of the hub-shell is rotatably mounted a driving screw 10 which engages a threaded socket 11 in one end of the slidable frame or plate 3. The screw 10 is provided with the collars 12 which prevent any lengthwise movement of the screw in either direction and limit the motion of the screw to a rotary motion in its bearing in the rim or flange 9. While the lateral walls of the box 2 are not shown, it will be readily understood that they are formed with vertical slots in which ride the ends of the cross-piece 5. To lock the bicycle so that it cannot be ridden, the screw 10 is turned by means of the key 13 (Fig. 5) so as to draw the plate 3 to the right in Fig. 1, thus forcing the pin 7 against the slidable non-rotary axle-mounted brake-disk s and locking or securing the hub-shell to the axle. This prevents the rotation of the hub-shell i and so of the rear wheel (not shown).

It will be understood that the invention herein before described is entirely independent of the particular means used to rotate the driving screw d. My new coaster brake is equally applicable to a chain driven wheel as to a gear-driven or chainless wheel.

What I claim is:
1. The combination in a coaster-brake of an axle-bar formed with a squared portion; a hub-shell free to rotate therearound; a clutch member secured to said hub-shell at one end thereof; a brake-disk secured to said hub-shell at the other end thereof; a driving screw extending within said hub-shell and mounted free to rotate upon said axle-bar; a second clutch member formed with threads which engage the threads upon said driving screw and mounted thereon between the first-named clutch member and said brake-disk; a non-rotary brake-disk mounted upon the squared portion of said axle-bar free to slide along the same and interposed between said second clutch member and said hub-carried brake-disk; a stop key upon said axle-bar; yielding means which tend to force said brake-disks apart, said slidable non-rotary brake-disk being mounted between said yielding means and stop key; and a pair of similar axle adjusting cones, one at each end of said axle-bar.

2. The combination in a coaster brake of an axle-bar; a driving screw mounted thereon; a hub-shell free to rotate relatively to said driving screw; a pair of clutch members, one of which is mounted fast upon said hub-shell and the other of which is mounted upon said screw; and means operable from outside said hub-shell for holding said clutch members in engagement with each other, said means being independent of said screw.

3. The combination in a coaster brake of a stationary axle-bar; a hub-shell mounted free to rotate therearound; a non-rotary disk mounted on said axle-bar; a locking-pin carried by said hub-shell; and mechanism carried by said hub-shell and operable from without the same for forcing said locking-pin into engagement with said non-rotary disk.

ANDERS LARSEN.

Witnesses:
A. BONNESEN,
O. WESTERGAARD.